United States Patent
Halkosaari

(10) Patent No.: US 7,362,853 B2
(45) Date of Patent: Apr. 22, 2008

(54) COST NEGOTIATION FOR COMMUNICATION SESSIONS

(75) Inventor: Matti Halkosaari, Turku (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 10/537,223

(22) PCT Filed: Dec. 16, 2002

(86) PCT No.: PCT/EP02/14407

§ 371 (c)(1),
(2), (4) Date: Jun. 3, 2005

(87) PCT Pub. No.: WO2004/056079

PCT Pub. Date: Jul. 1, 2004

(65) Prior Publication Data

US 2006/0056607 A1   Mar. 16, 2006

(51) Int. Cl.
*H04M 15/00* (2006.01)
(52) U.S. Cl. ............... 379/114.12; 379/114.22; 379/205.01; 370/352
(58) Field of Classification Search ........... 379/111, 379/114.01, 114.06, 114.21, 114.22, 121.02, 379/121.05, 127.03, 114.12, 202.01, 205.01; 370/352–360
See application file for complete search history.

(56) References Cited

U.S. PATENT DOCUMENTS

| | | | | |
|---|---|---|---|---|
| 5,822,411 | A | * | 10/1998 | Swale et al. ........... 379/114.22 |
| 6,023,499 | A | * | 2/2000 | Mansey et al. ............. 379/111 |
| 6,047,051 | A | | 4/2000 | Yla-Jaaski et al. |
| 6,584,186 | B1 | * | 6/2003 | Aravamudan et al. . 379/201.03 |
| 2003/0114142 | A1 | * | 6/2003 | Brown et al. ............... 455/408 |
| 2005/0021351 | A1 | * | 1/2005 | Koskinen et al. .............. 705/1 |
| 2005/0238151 | A1 | * | 10/2005 | Brown et al. .......... 379/114.01 |
| 2005/0271193 | A1 | * | 12/2005 | Koskinen et al. ...... 379/114.01 |

FOREIGN PATENT DOCUMENTS

| | | | |
|---|---|---|---|
| WO | WO 00/38403 | A | 6/2000 |
| WO | WO 00/79756 | A | 12/2000 |
| WO | WO 02/052832 | A | 7/2002 |

OTHER PUBLICATIONS

European Patent Office, International Search Report for PCT/EP02/14407, dated Mar. 2, 2004.

* cited by examiner

*Primary Examiner*—Binh K. Tieu
(74) *Attorney, Agent, or Firm*—Roger S. Burleigh

(57) ABSTRACT

A method of negotiating the sharing of a cost associated with a communication service between a plurality of participants. The method comprises sending a cost sharing request from a terminal 1 used by a first of the participants to the terminal 12,13 used by the or each other participant At the or each terminal 12,13 receiving said request, the request is processed using predefined cost sharing rules and/or user input relating to the request received. The initiating terminal 1 is notified of the result. Messages exchanged between the participating terminals are intercepted within the network(s) 2,14 supporting the service, and the participants charged in accordance with the negotiated cost sharing formula.

10 Claims, 4 Drawing Sheets

COST NEGOTIATION FOR COMMUNICATION SESSIONS

FIELD OF THE INVENTION

The present invention relates to cost control negotiation for communication sessions including telecom and data communication sessions, and is applicable in particular, though not necessarily, to IP sessions which are setup using the Session Initiation Protocol (SIP).

BACKGROUND OF THE INVENTION

The arrival of new communication technologies such as third generation mobile technologies will allow existing services to be significantly enhanced and will also allow the introduction of new advanced service. Examples of new services are video conferencing, multi-participant gaming, and instant messaging. Consumers will be expected to pay extra for these enhanced and new services, as compared to what they pay for the currently available services. However, the nature of many of the services will mean that new charging mechanisms will be needed if consumers are not to be dissuaded by the high costs.

In the case of multi-participant services, some form of cost sharing may be appropriate. A simple mechanism for sharing the costs of a long distance telephone call between originating and terminating subscribers is described in U.S. Pat. No. 5,381,467. This relies upon the local exchange of the terminating subscriber (or the terminating inter exchange carrier switch) detecting that call sharing is activated for calls received from a given originating subscriber, and an interaction between the terminating subscriber and the local exchange to accept or reject the cost sharing option. There is a limited possibility for the terminating subscriber to specify the cost sharing formula, but there is no possibility for the originating subscriber to influence the final formula.

STATEMENT OF THE INVENTION

The mechanism described in U.S. Pat. No. 5,381,467 is relatively inflexible as it relies upon the local exchange of the terminating subscriber to intercept calls to which cost sharing might apply and to apply the cost sharing formula.

It is an object of the present invention to overcome or at least mitigate the disadvantages of the prior art. These and other objects are achieved by performing a cost sharing negotiation at the user level by using user level signalling.

According to a first aspect of the present invention there is provided a method of negotiating the sharing of a cost associated with a communication service between a plurality of participants, the method comprising:

sending a cost sharing request from a terminal used by a first of the participants to terminals used by the or each other participant; and at the or each terminal receiving said request, processing the request using predefined cost sharing rules and/or receiving user inputs relating to the request, and notifying the first participant's terminal of the result, the network(s) supporting the service being informed of the negotiated cost sharing formula, and the participants being charged by the network(s) in accordance with the formula.

In embodiments of the present invention, the "logic" performing the cost sharing negotiation is implemented in the user terminals.

Preferably, the network(s) supporting the service are informed of the negotiated cost sharing formula by intercepting the messages exchanged between the participating terminals within the network(s). Alternatively, a participating terminal may send a notification message to a network, the message containing the negotiated formula.

The cost sharing request may be sent from either a terminal initiating a service, or from a terminal which has received a service initiation request from another terminal. The terminal receiving a cost sharing request may return a response to the sending terminal accepting a cost sharing proposal contained or identified in the request. This proposal may be some previously agreed arrangement, for example associated with a particular service. Alternatively, the receiving terminal may send a response to the sending terminal, and any other terminals invited to participate in the service, proposing an alternative or modified cost sharing proposal. Typically, the terminal sending the request, coordinates received responses and finalises the cost sharing arrangement. The final arrangement may be notified to the or each other participant.

The cost sharing method may be performed prior to the initiation of the communication service, upon initiation, during the provision of a service, or even after a service has been terminated.

In an embodiment of the present invention, the network supporting the service and connecting the participating terminals comprises a 3GPP (third generation partnership project) IP Multimedia Subsystem. The terminal-to-terminal signalling protocol is preferably the Session Initiation Protocol (SIP).

According to a second aspect of the present invention there is provided a communication terminal comprising:

transmission means for exchanging user and signalling data with one or more peer terminals via a communications network;

means coupled to said transmission means for receiving and sending cost sharing requests to and from peer terminals, the cost sharing requests relating to a communication service involving the terminals;

means for implementing a set of cost sharing rules following the sending or receipt of a cost sharing proposal in order to agree upon a cost sharing arrangement.

In certain embodiments of the present invention the terminal is a mobile wireless terminal. Preferably the terminal is a 3G terminal able to communicate with peer terminals via a 3G network using IP. More preferably, the terminal uses SIP signalling to exchange cost sharing requests with other terminals and to exchange other signals associated with cost sharing negotiations.

According to a third aspect of the present invention there is provided a Session Initiation Protocol server for use in an IP Multimedia Core Network Subsystem of a communications system, the server comprising:

means for causing Session Initiation Protocol signalling, associated with a cost sharing negotiation between two or more user terminals coupled to the system, to be diverted through the server; and means for extracting agreed cost sharing data from the diverted signalling, and for either allocating costs to one or more of the terminal users in accordance with this data, or for providing information to another system node to allow that node to allocate costs.

DETAILED DESCRIPTION OF A PREFERRED EMBODIMENT

Figure 1:
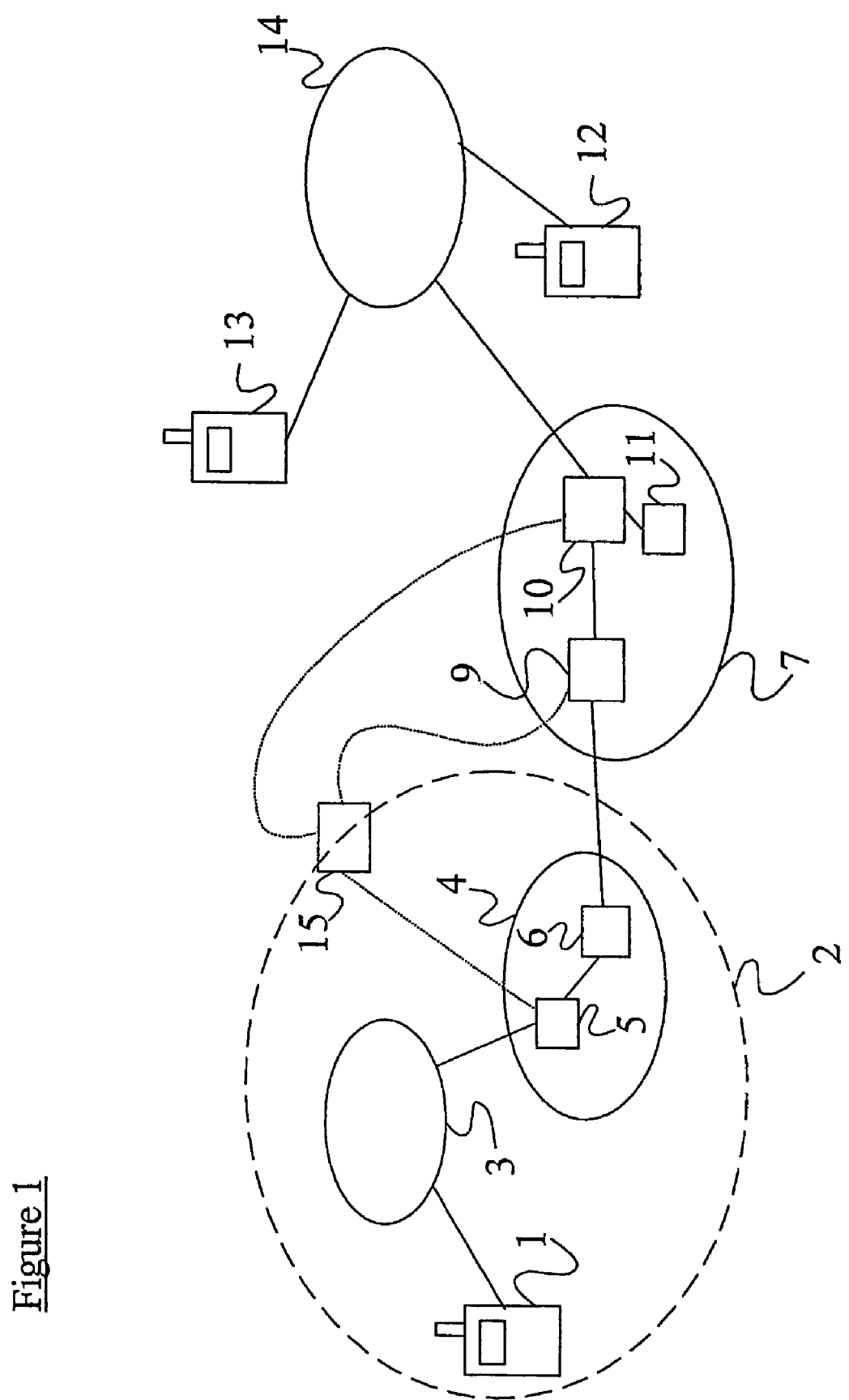
FIG. 1 illustrates schematically a communications system to which a number or mobile wireless terminals are attached.

FIG. 1 illustrates schematically a typical scenario where a mobile terminal or User Equipment (UE) 1 belongs to a subscriber of a cellular telephone network 2 (the subscriber's "home" network). The subscriber using the UE 1 is identified in the network 2 by a unique subscriber identity. The cellular telephone network comprises a Radio Access Network 3 and a General Packet Radio Service (GPRS) network 4 (as well as a circuit switched core network which is not illustrated in FIG. 1). Within the GPRS network 4, two nodes relevant to the UE 1 can be identified. These are the Serving GPRS Support node (SGSN) 5 and the Gateway GPRS Support Node (GGSN) 6. The role of the SGSN 5 is to maintain subscription data (identities and addresses) and to track the location of the UE within the network. The role of the GGSN 6 is to maintain subscription information and allocated IP addresses and to track the SGSN to which the UE 1 is attached. The GGSN 6 is coupled to an IP network. Typically, when the UE 1 is turned on it "attaches" itself to the GGSN and one or more PDP contexts are established between the UE 1 and the GGSN 6. The contexts provide "pipes" for transporting data from the UE 1 to the GGSN 6. This process involves the allocation of an IP address to the UB 1. Typically, the routing prefix part of the address is a routing prefix allocated to the GGSN 6. In the event that a subscriber is roaming outside of his home network, the RAN 3 would of course belong to the visited network.

Also illustrated in FIG. 1 is an IP Multimedia Core Network Subsystem (IMS) 7 which contains all of the elements required to provide IP based multimedia services using the Session Initiation Protocol (SIP). The functionality provided by the IMS 7 is set out in 3GPP TS 23.228. The IMS 7 consists of a set of nodes which are coupled to an IP backbone network. This network is also connected to the GGSN 6 of the GPRS network 4. Illustrated within the IMS 7 are a proxy call state control function (P-CSCF) node 9 and a serving call state control function (S-CSCF) node 10. It is assumed here that the IMS is owned by the operator of the cellular telephone network 2 (although this need not be the case).

The S-CSCF 10 performs the session control services for the UB, and maintains a session state as needed by the network operator for support of services. The main function performed by the S-CSCF 10 during a session is the routing of incoming and outgoing call set-up requests. The main functions performed by the P-CSCF 9 are to identify the S-CSCF, using the HSS of the home network, allocated to the UE and to subsequently route SIP messages between the UE and the identified S-CSCF when the UE 1 is roaming in a visited network (NB. for a terminal roaming in a visited network, the IMS through which signalling is routed will be the IMS of the subscriber's home network).

Illustrated in FIG. 1 are additional UEs 12,13 belonging to respective subscribers of a network 14. The UEs 12,13 are attached to their own network 14 although they could equally well be attached to a visited network. The network 14 may consists of a RAN, GPRS network and IMS network, mirroring the network used by the UE 1.

Real-time charging messages (e.g. using CAP protocol) may be generated within the GPRS access network 4. In particular, the SGSN 5 may generate real-time charging messages for a given connection. The real-time charging messages generated by the SGSN 5 may relate to the volume of data sent during the call, and/or the duration of the call. Typically, all real-time CAP messages associated with the call are sent to a Charging Control Function 15 (CCF) belonging to the operator of the cellular telephone network 2. Real-time charging messages may also be generated within the IMS 7 at the S-CSCF 11 or at some other charging node. Charges generated within the IMS 7 may for example be associated with particular services (the GPRS core network 4 generally has no knowledge of the service with which user data is associated), for example online gaming and video-conferencing. Charging messages generated within the IMS 7 are also forwarded to the CCF 15 (using the DIAMETER protocol) which consolidates all charges relating to a session and adds the appropriate charge to a subscriber's bill. Charges generated within the network 14 (at either the GPRS core network or the IMS) are similarly forwarded to a CCF of that network. Where a UE is attached to a visited network, real-time charges may be forwarded from the visited network to a CCF of a subscriber's home network, e.g. to facilitate real-time billing, avoiding the need for operator's to provide subscribers with credit. In addition to, or as an alternative to real time charging messages, nodes such as the SGSN and the S-CSCF might generate off-line charges, e.g. upon termination of a call. These will also be sent to the appropriate CCF.

In certain cases, a subscriber wishing to initiate a service involving one or more other subscribers may propose to those other subscribers that the cost for the service be shared by all of the participants. Assume that the UE 1 wishes to initiate a session with the UBs 12,13, e.g. a video-conference. To initiate the service, the UE 1 sends a SIP PMTE message to the UEs 12,13. This message is passed by the GPRS network 4 to the IMS 7. The IMS 7 will negotiate appropriate resources with the IMS of the network 14. The INVITE message is then forwarded to the "terminating" UEs 12,13. The INVITE message contains a cost sharing request, e.g. split the cost equally between the participants. In some circumstances, the IMS may modify the SIP INVITE message (and other SIP messages sent between peer terminals).

Each UE contains means for implementing a set of cost sharing rules. Upon receiving a SIP INVITE message containing a cost sharing request, these rules may simply cause the UE to notify the user of the request, and to ask for his or her approval or rejection of the proposal, thereby implicitly accepting or rejecting, or placing on hold, the session setup procedure. The rules may allow the user to input a counter proposal. The UE may provide for the inputting of subscriber configurable schemes. For example, costs may be predefined on a per originating subscriber (or subscriber group) basis, on a per service (or service group) basis, or on a per price or price category basis, such that the terminating UE can respond automatically to all (or at least a class) of call setup requests.

The results, i.e. acceptance, rejection, or counter proposal are returned by the terminating UEs to the originating UE 1. The originating UE 1 acts as a coordinating agent for the negotiation, receiving responses from other UEs and consolidating the responses to achieve a final agreed cost sharing plan. This coordinating function may be performed "automatically" using some application running in the UE 1, or may be performed by the user of the UE 1. As with the terminating UEs, rules may be predefined for this purpose (per subscriber, etc).

The originating UE 1 will then notify the UEs which have agreed to share the total cost (this may be by way of a percentage share or by way of an actual tariff, e.g. 10 cents/minute). There may be no need to notify the UEs of the cost shares allocated to other participants, although this can of course be done. Final confirmation of the cost sharing plan by the terminating UEs 12,13 is provided by the return of a SIP OK message to the originating UE 1. This messages causes the session to be established. It will be appreciated that SIP is used to carry all messages associated with the cost sharing negotiation. If existing SIP messages cannot be used, it may be necessary to define new messages.

The procedure presented above applies both to negotiating costs for one time service events, duration based service events, data volume based service events, or a combination of two or more of these. If there are services invoked within another service, e.g. a costly video streaming application invoked towards all participants during a teleconference, then the above described procedure can be applied first for the basic teleconference "session" and individually for each new service application, e.g. video streaming, invoked during the teleconference session.

Figure 2:
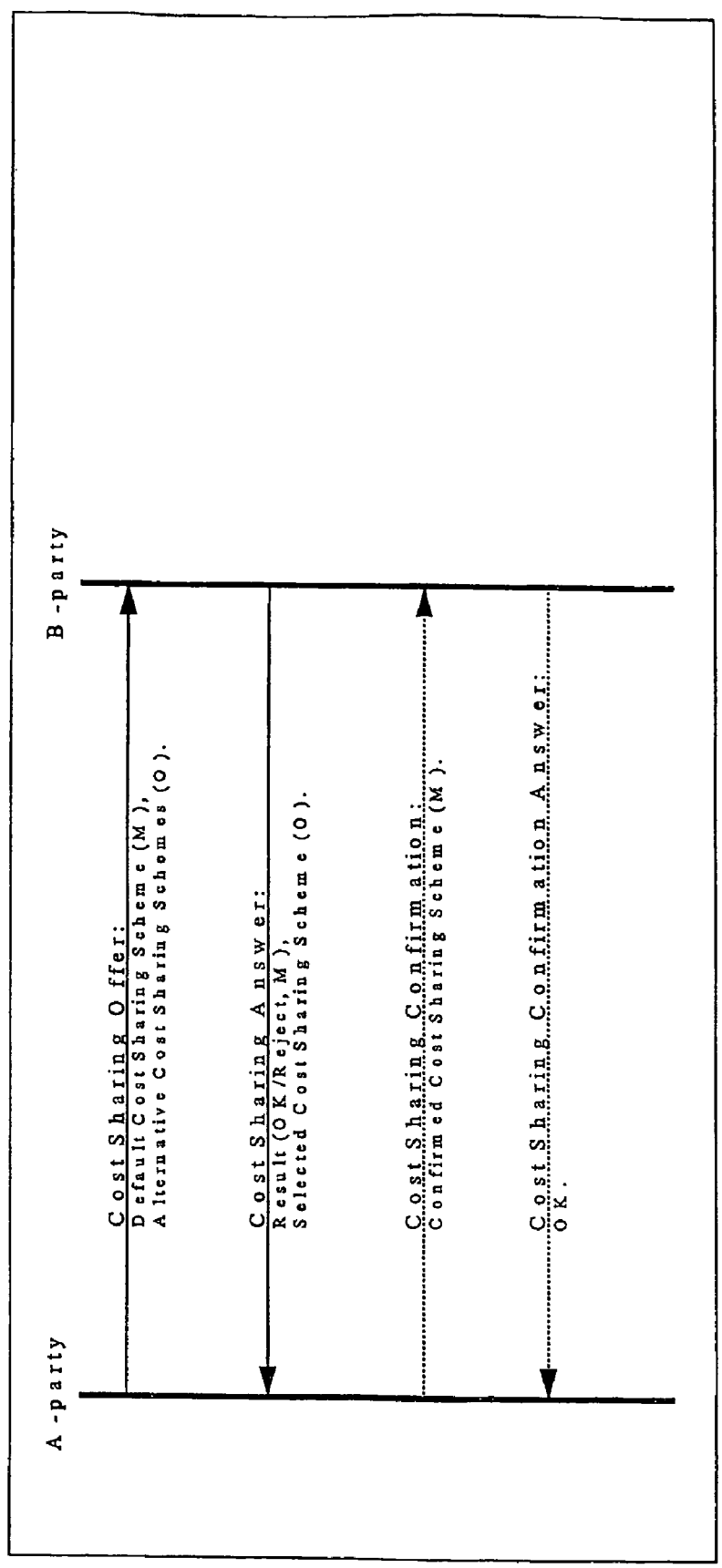
FIG. 2 illustrates signalling between a pair of peer terminals attached to the system of FIG. 1.

FIG. 2 illustrates the signalling between peer UEs which might be associated with a cost sharing negotiation and where:

Solid arrows represent mandatory messages;
Dotted arrows represent optional messages;
The message name is written on top of the message arrow;
Message parameters are written below the message arrow;
Mandatory message parameters are marked as 'M'; and
Optional message parameters are marked as "O'.

The third and fourth, optional signalling messages are exchanged in the event that the preceding messages have resulted in a cost sharing agreement, and are necessary to confirm the final agreed cost sharing plan to both parties. These messages also enable the home networks of both parties to identify the details of the agreement The above discussion assumes that the cost sharing negotiation results from a service initiation request (the cost sharing request is included in the SIP INVITE message). However, it may be that a UE wishes to propose to one or more other UEs a cost sharing plan for a service which has not yet been initiated. In this case, the cost sharing request must contain some identification of the service. This could be for example a service identifier and a proposed commencement date and time. Similarly, a cost sharing negotiation may be carried out during an already established session or after a session has been terminated.

Figure 3:
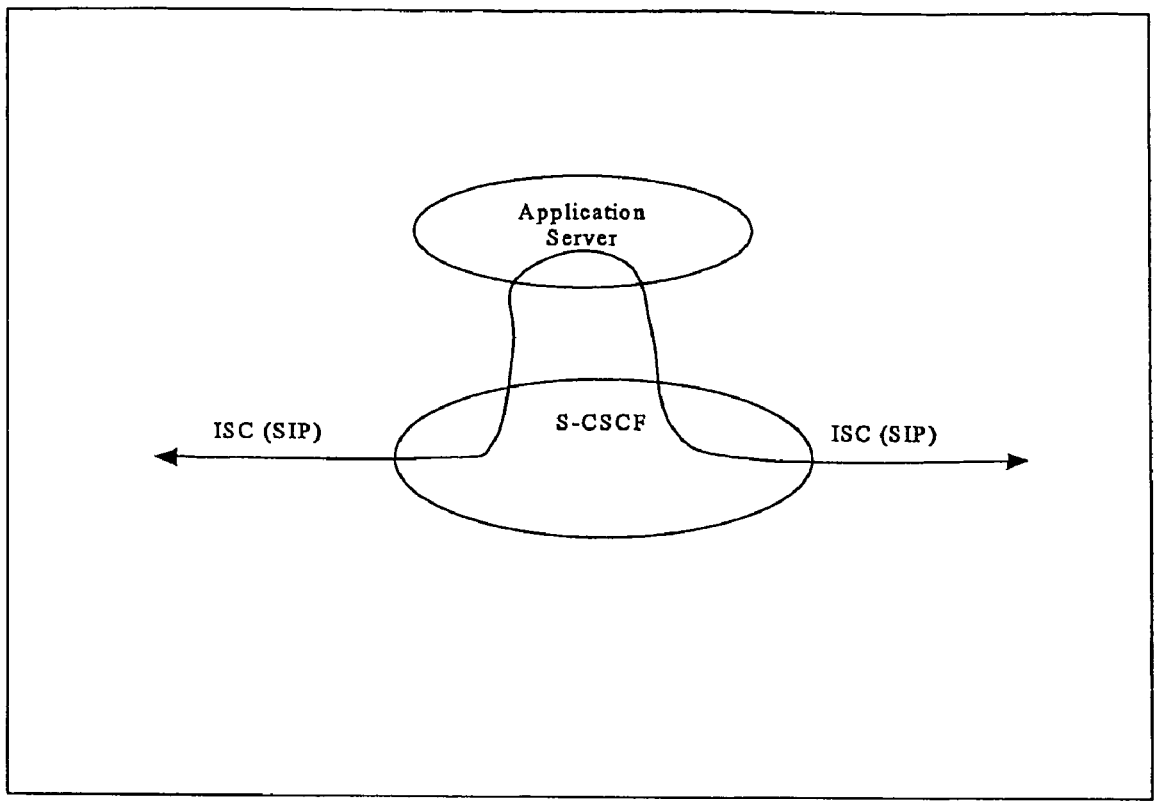
FIG. 3 is a flow diagram illustrating a method of negotiating cost sharing between peer terminals.

It has already been mentioned that it is necessary for the home networks of the participating UEs to "intercept" SIP signalling associated with cost sharing negotiations in order to allow subscribers to be charged according to the agreed cost sharing plan. FIG. 3 illustrates one way in which this might be done. The IMS 7 includes an Application Server 16 which monitors SIP messages and message headers between the A-party and the B-party (or parties). The Application Server 16 has previously instructed the S-CSCF 10 (via the HSS which is located in the home network 2 of the UE 1) to forward to it SIP messages which might initiate a cost sharing negotiation. When the Application Server 16 detects that a cost negotiation may take place between UEs for a particular dialogue, it adds itself to the SIP route, whereafter all SIP messages are routed via the Application Server 16. When the cost sharing negotiation has taken place, (and where for example a cost sharing negotiation is possible only in the setup phase of a value added service), the Application Server 16 removes itself from the SIP routing path. The cost negotiation results are extracted from the signalling, recorded, and sent towards the CCF 14 by the Application Server 16. The CCF 14 can subsequently apportion costs to the UE 1 (including any costs received from the GPRS network 4). Similarly, SIP signalling is intercepted in the IMS of the network 14 (using an application server) to which the B-subscribers 12,13 are attached, and the CCF of that network informed of the cost sharing agreement. If one operator collects more than he is due by a particular subscriber, some cross-settlement procedure is used to exchange money between the operators.

Note that the Application Server 16 in FIG. 3 may implement functions other than those related to cost sharing. The server may for instance contain the service logic for the value added service for which the cost is being negotiated. The Application Server may also record the cost negotiation information both in the home domain of the A-party and the home domain of the B-party (or parties) for the same SIP session.

Figure 4:
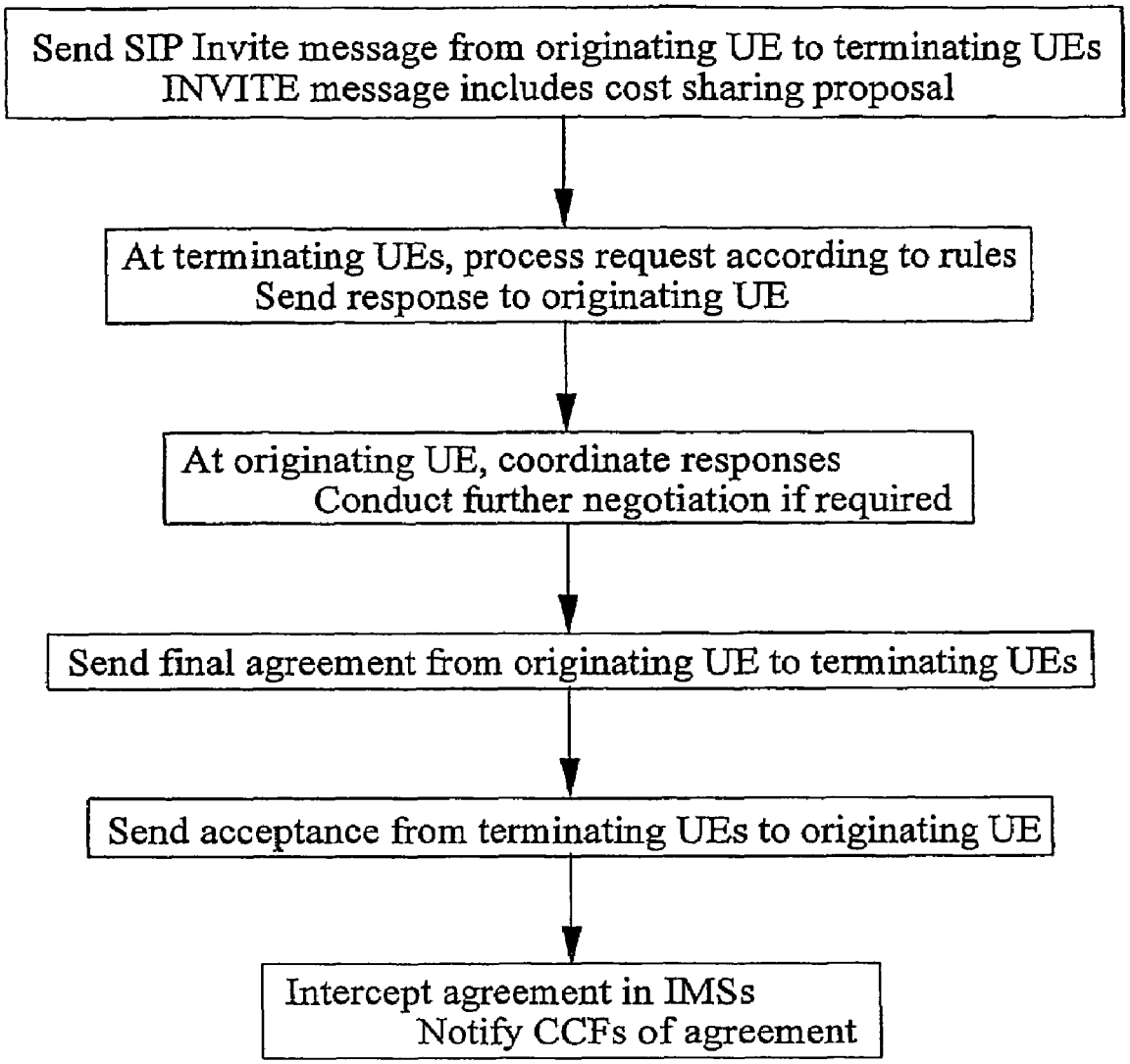
FIG. 4 illustrates schematically the introduction of an Application Server into the system of FIG. 1.

FIG. 4 is a flow diagram further illustrating the cost sharing negotiation procedure described above.

It will be appreciated by the person of skill in the art that various modifications may be made to the above described embodiments without departing from the scope of the present invention For example, whilst the above discussion has concerned wireless terminals and cellular networks, the invention can also be applied to wireline terminals and networks (e.g. BMSN, EMM 1.0). Providing appropriate interworking functionality is employed, wireless terminals will be able to negotiate cost sharing agreements with wireline terminals.

The invention claimed is:

1. A method of negotiating a cost sharing formula associated with a communication service between a plurality of participants, the service being facilitated using the Session Initiation Protocol, the method comprising the steps of:

sending a Session Initiation Protocol (SIP) message from a terminal used by a first of the participants to terminals used by each other participant, the message containing a cost sharing request:

at each terminal, receiving said cost sharing request, processing the request using predefined cost sharing rules or by receiving a user input relating to the request, and sending a SIP response message to the first participants terminal containing a result; and, configuring one or more SIP servers to intercept SIP messages for the purpose of determining the negotiated cost sharing formula, whereby the participants are charged in accordance with the formula.

2. The method according to claim 1, wherein the message containing the cost sharing request is sent from either a terminal initiating a service or from a terminal which has received a service initiation request from another terminal.

3. The method according to claim 1, wherein the terminal receiving a cost sharing request returns a response to the sending terminal accepting a cost sharing proposal contained or identified in the request.

4. The method according to claim 1, wherein the receiving terminal sends a response to the sending terminal proposing an alternative or modified cost sharing proposal.

5. The method according to claim 1, wherein three or more participants are invited to join the service, the terminal sending the request coordinating received responses and finalizing the cost sharing arrangement.

6. The method according to claim 1, wherein the cost sharing procedure is performed prior to the initiation of the communication service.

7. The method according to claim 1, wherein the network supporting the service and connecting the participating terminals comprises a 3GPP IP Multimedia Subsystem.

8. A Session Initiation Protocol (SIP) enabled communication terminal comprising:
   transmission means for exchanging user and SIP signaling data with one or more peer SIP terminals via a communications network;
   means coupled to said transmission means for receiving and sending cost sharing requests to and from peer terminals, the cost sharing requests relating to a communication service involving the terminals and being carried in SIP messages:
   means for implementing a set of cost sharing rules following the sending or receipt of a cost sharing proposal in order to agree upon a cost sharing formula, 9. The terminal according to claim 8, wherein the terminal is a mobile wireless terminal.

10. A Session Initiation Protocol (SIP) server for use in an IP Multimedia Core Network Subsystem of a communications system, the server comprising:
    means for causing SIP signaling, associated with a cost sharing negotiation between two or more user terminals coupled to the system, to be diverted through the server; and,
    means for extracting agreed cost sharing data from the diverted signaling; and
    means for either allocating costs to one or more of the terminal users in accordance with this data or for providing information to another system node to allow that node to allocate costs.

* * * * *

UNITED STATES PATENT AND TRADEMARK OFFICE
CERTIFICATE OF CORRECTION

PATENT NO. : 7,362,853 B2
APPLICATION NO. : 10/537223
DATED : April 22, 2008
INVENTOR(S) : Halkosaari It is certified that error appears in the above-identified patent and that said Letters Patent is hereby corrected as shown below:

In Column 3, Line 37, delete "UB" and insert -- UE --, therefor.

In Column 3, Line 55, delete "UB," and insert -- UE, --, therefor.

In Column 4, Line 39, delete "UBs" and insert -- UEs --, therefor.

In Column 4, Line 40, delete "PMTE" and insert -- INVITE --, therefor.

In Column 6, Lines 51-52, in Claim 1, delete "participants" and insert -- participant's --, therefor.

In Column 8, Line 3, in Claim 8, delete "formula," and insert -- formula. --, therefor.

Signed and Sealed this

Twentieth Day of January, 2009

JON W. DUDAS
*Director of the United States Patent and Trademark Office*